United States Patent [19]

Jones et al.

[11] Patent Number: 4,609,701

[45] Date of Patent: Sep. 2, 1986

[54] THERMOPLASTIC PVC MOLDING COMPOSITIONS

[75] Inventors: Jesse D. Jones; Edwin D. Hornbaker, both of Baton Rouge, La.

[73] Assignee: Ethyl Corporation, Richmond, Va.

[21] Appl. No.: 698,163

[22] Filed: Feb. 4, 1985

Related U.S. Application Data

[62] Division of Ser. No. 209,843, Nov. 24, 1980, Pat. No. 4,510,280.

[51] Int. Cl.$^4$ .................. C08L 27/06; C08L 25/08; C08L 51/04
[52] U.S. Cl. ...................... 524/178; 524/179; 524/180; 524/504; 524/517; 525/71; 525/74; 525/207
[58] Field of Search ............... 525/74, 207; 524/178, 524/517

[56] References Cited

U.S. PATENT DOCUMENTS

| | | | |
|---|---|---|---|
| 3,626,033 | 12/1971 | Keskkula et al. | 525/74 |
| 3,632,839 | 1/1972 | Young et al. | 525/207 |
| 3,720,734 | 3/1973 | Kopachi et al. | 525/207 |

OTHER PUBLICATIONS

Journal of Polymer Science-Fava et al., vol. 21, pp. 791-796 (1977).

*Primary Examiner*—Carman J. Seccuro
*Attorney, Agent, or Firm*—Donald L. Johnson; John F. Sieberth; E. Donald Mays

[57] ABSTRACT

Blends of (a) a vinyl chloride polymer having a relative viscosity as measured at a concentration of 1 gram per 100 grams of cyclohexanone at 25° C. falling within the range of about 1.50 to about 1.85; (b) a copolymer of a vinyl aromatic compound and an $\alpha,\beta$-unsaturated cyclic anhydride in which the relative proportions of said compound and said anhydride fall within the range of about 91 to about 70 weight percent of said compound and about 9 to about 30 weight percent of said anhydride; and (c) a tin-containing stabilizer and an impact modifier for vinyl chloride polymers. These blends contain 60 to 40 weight percent of (a) and 40 to 60 weight percent of (b) and have an Izod impact strength (ASTM D 256, Method A) of at least 0.5 foot pound per inch; a heat deflection temperature (ASTM D 648) at 66 psi of at least 75° C.; and a dynamic thermal stability of at least 10 minutes.

8 Claims, No Drawings

THERMOPLASTIC PVC MOLDING COMPOSITIONS

This application is a division of application Ser. No. 209,843, filed Nov. 24, 1980, now U.S. Pat. No. 4,510,280.

This invention relates to vinyl chloride polymer compositions of enhanced performance characteristics.

BACKGROUND

Vinyl chloride resins are widely used in the manufacture of various useful end products, including moldings, tile, pipe, sheets, film, bottles, and the like. Unfortunately, unplasticized vinyl chloride resins used in the manufacture of rigid end products tend to have poor heat deformation characteristics. Consequently, they are unsuitable for use in certain areas of application where structural integrity under heat and load is of prime importance.

Heretofore, attempts have been made to improve upon the relatively poor heat deformation characteristics of polyvinyl chloride resins. For example, in U.S. Pat. No. 3,626,033 ternary compositions are described which comprise 50 to 75 weight percent of a vinyl chloride resin, 10 to 35 weight percent of a polydiene rubber nitrile graft copolymer and 15 to 35 weight percent of an anhydride-containing copolymer, such as styrene-maleic anhydride.

British Pat. No. 1,297,505 discloses that small amounts of certain copolymers such as styrene-maleic anhydride can be admixed with polyvinyl chloride homopolymer to improve impact strength of the end product. The amount of such anhydride copolymer used ranges from 0.1 up to 5 parts by weight per 100 parts by weight of the PVC homopolymer. Although tensile impact strength of the PVC is shown to be improved by this means, nothing is said about the heat deformation characteristics of the resultant binary blends.

In *Journal of Applied Polymer Science, Vol.* 21, pages 791–796 (1977), the results of torsional pendulum analyses are set forth for a 50:50 blend of polyvinyl chloride and styrene-maleic anhydride copolymer. At page 795 the authors points out that this blend is opaque and brittle, bearing all the marks of incompatability. The styrene-maleic anhydride copolymer used in this experimental work was Dylark 232 from ARCO/Polymers, Inc. which is understood to contain 92 percent by weight of styrene and 8 percent by weight of maleic anhydride. It is rubber free.

THE INVENTION

It has now been discovered that blends of vinyl chloride polymers and copolymers of the styrene-maleic anhydride type can be produced having a number of superior performance characteristics, including increased resistance to heat deformation under load, and flame resistance, as well as other properties desired in thermoplastic molding compositions. These new compositions are readily produced by known blending procedures and require no special preparatory techniques or precautions.

The thermoplastic molding compositions of this invention comprise in intimate admixture (a) a vinyl chloride polymer having a relative viscosity as measured at a concentration of 1 gram per 100 grams of cyclohexanone at 25° C. falling within the range of about 1.50 to about 1.85; (b) a thermoplastic copolymer of a vinyl aromatic compound and an $\alpha,\beta$-unsaturated cyclic anhydride in which the relative proportions of said compound and said anhydride fall within the range of about 91 to about 70 weight percent of said compound and about 9 to about 30 weight percent of said anhydride; and (c) a tin-containing stabilizer and an impact modifier for vinyl chloride polymers; with the proviso that the blend contains 60 to 40 (preferably 55 to 45) weight percent of (a) and 40 to 60 (preferably 45 to 55) weight percent of (b) and the further proviso that the blend has the following properties: (d) an Izod impact strength (ASTM D 256, Method A) of at least 0.5 foot pound per inch (e) a heat deflection temperature (ASTM D 648) at 66 psi of at least 75° C.; and (f) a dynamic thermal stability of at least 10 minutes.

The procedure used to measure dynamic thermal stability is as follows: A Brabender Plasticorder fitted with a No. 6 mixing head heated to 190° C. is charged with 60 grams of the formulation to be tested, with the rotor speed being held constant at 150 rpm after charging. The test is continued at 190° C., with 150 rpm rotor speed, until the torque increases by 200 meter-grams above the equilibrium torque (which is the constant torque value attained following the initial substantial torque increase observed during fusion of the formulation). The dynamic thermal stability is expressed as the time from charging of the sample until this 200 meter-grams torque increase has occurred. Thus the longer the time, the higher the dynamic thermal stability.

In a preferred embodiment of this invention, the blend is made from a rubber-modified thermoplastic copolymer of a vinyl aromatic compound and an $\alpha,\beta$-unsaturated cyclic anhydride. Here again the relative proportions of the vinyl aromatic compound and the $\alpha,\beta$-unsaturated cyclic anhydride in the resin phase of the copolymer fall within the range of about 91 to about 70 weight percent of the vinyl aromatic compound and about 9 to about 30 weight percent of the cyclic anhydride, but in this case the graft copolymer contains up to about 33 parts (preferably 25 parts or less) by weight of the rubber per 100 parts by weight of the copolymer itself.

Hence this invention also provides thermoplastic molding compositions which comprise in intimate admixture: (a) a vinyl chloride polymer having a relative viscosity as measured at a concentration of 1 gram per 100 grams of cyclohexanone at 25° C. falling within the range of about 1.50 to about 1.85; (b) a thermoplastic rubber-modified graft copolymer of a vinyl aromatic compound and an $\alpha,\beta$-unsaturated cyclic anhydride in which the relative proportions of said compound and said anhydride fall within the range of about 91 to about 70 weight percent of said compound and about 9 to about 30 weight percent of said anhydride, and in which the graft copolymer contains up to 33 (preferably up to about 25) parts by weight of the rubber per 100 parts by weight of the copolymer; and (c) a tin-containing stabilizer and an impact modifier for vinyl chloride polymers; with the proviso that the blend contains 60 to 35 (preferably 55 to 40) weight percent of (a) and 40 to 65 (preferably 45 to 60) weight percent of (b); and with the further proviso that the blend has the properties in accordance with (d), (e), and (f) presented hereinbefore.

Component (a), the vinyl chloride resin, may be a homopolymer of vinyl chloride or a copolymer of vinyl chloride with a minor portion of one or more monomers copolymerizable with vinyl chloride. In such copolymers vinyl chloride comprises on a weight basis at least about 90 percent of the copolymer and the copolymerizable monomer comprises up to about 10 percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether and vinyl cetyl ether; acrylic acid and methacrylic acid; acrylonitrile and methacrylonitrile; diethyl fumarate; maleic anhydride; dimethyl itaconate; styrene; N-vinyl carbazole; N-vinyl pyrrolidone; allyl compounds such as allyl chloride; diolefins such as butadiene, isoprene, chloroprene and the like; or mixtures thereof. Further, the vinyl chloride resins include halogenated polyvinyl chloride and the like.

Methods for the preparation of vinyl chloride polymers are well known in the art and reported in the literature. See for example Kirk-Othmer, *Encyclopedia of Chemical Technology*, Second Edition, Interscience Publishers, Volume 21, pages 369–412. (Copyright 1970), the disclosure of which is incorporated herein. Vinyl chloride polymers having suitable relative viscosities for use in the practice of this invention are available from a number of commercial suppliers. For best results the relative viscosity (as measured at a concentration of 1 gram per 100 grams of cyclohexanone at 25° C.) of the vinyl chloride resin should fall within the range of about 1.50 to about 1.65 and accordingly the use of such vinyl chloride resins is preferred. Polyvinyl chloride homopolymer resins falling within this relative viscosity range are particularly preferred.

Component (b), copolymers of a vinyl aromatic compound and an $\alpha,\beta$-unsaturated cyclic anhydride, are also well known in the art and are described in the literature. In general, they may be prepared by conventional bulk or solution techniques using free radical initiation. For example, styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, benzene, toluene or xylene is used.

Vinyl aromatic compounds of component (b) can be compounds of the formula:

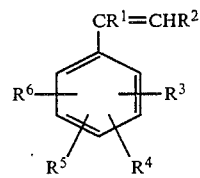

where $R^1$ and $R^2$ are independently selected from the group consisting of alkyl groups of from 1 to 6 carbon atoms and hydrogen; $R^3$, $R^4$, $R^5$ and $R^6$ are independently selected from the group consisting of chloro, bromo, hydrogen and alkyl of from 1 to 6 carbon atoms; and two of $R^3$, $R^4$, $R^5$ and $R^6$ may be concatenated together with hydrocarbyl groups to form a naphthyl group in which the vinylic substituent is preferably in the 1-position. All such compounds are free of any substituent that has a tertiary carbon atom. Preferred vinyl aromatics are the styrenes, i.e., compounds in which $R^2$ is hydrogen and $R^3$, $R^4$, $R^5$ and $R^6$ are independently hydrogen, alkyl of 1 to 6 carbon atoms, chloro or bromo. Of these compounds, styrenes in which $R^1$ is hydrogen or methyl and $R^3$, $R^4$, $R^5$ and $R^6$ are independently hydrogen, methyl or ethyl are most preferred. Styrene itself is the most preferred vinyl aromatic compound.

The cyclic anhydride compounds of component (b) are preferably $\alpha,\beta$-unsaturated dicarboxylic anhydrides. For example, the term cyclic anhydride identifies anhydrides having the formula:

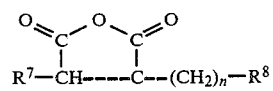

wherein the dashed lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms and n is an integer of from 0 to about 10. Examples include maleic anhydride, methyl maleic anhydride, dimethyl maleic anhydride, citraconic anhydride, itaconic anhydride, phenylmaleic anhydride, aconitic anhydride, and mixtures thereof. Maleic anhydride is the preferred anhydride of component (b).

Copolymers of vinyl aromatic compounds and $\alpha,\beta$-unsaturat cyclic anhydrides which can be used in the practice of this invention are described in U.S. Pat. Nos. 2,769,804; 2,971,939 and 3,336,267, the disclosures of which are incorporated herein by reference.

As noted above, these copolymers can be and preferably are rubber-modified copolymers. In preparing these rubber-modified copolymers use of such rubbers as polybutadiene, isobutyleneisoprene copolymers, styrene-butadiene copolymers, butadieneacrylonitrile copolymers, ethylene-propylene copolymers, polyisoprene, ethylene-propylene-diene monomer terpolymers (EPDM) and the like can be employed. In this connection see U.S. Pat. No. 3,919,354, the disclosure of which is incorporated herein by reference.

Component (b) copolymers whether rubber-modified or not comprise from about 91 to about 70 parts by weight of vinyl aromatic monomer and from about 9 to about 30 parts by weight of the $\alpha,\beta$-unsaturated cyclic anhydride copolymerized therewith. Preferred polymers include those wherein the relative proportions of the styrene and the anhydride fall within the range of from about 86 to about 80 weight percent of the styrene monomer and from about 14 to about 20 weight percent of the anhydride monomer. Preferred rubber-modified copolymers used herein contain about 5 to 25 (most preferably 10 to 22) parts by weight of the rubber per 100 parts by weight of the styrene/anhydride copolymer, although lesser amounts, even down to trace amounts of rubber, are feasible.

The tin containing stabilizer utilized in the blends of this invention is susceptible to considerable variation and involves use of materials well known and readily available in the art. Examples of suitable tin stabilizers include di-n-alkyl tin mercaptides, di-n-alkyl tin dilaurates, dibutyl tin dimaleate, dibuty tin lauryl mercaptide, di-octyl tin-S,S'-bis-(isooctylmercaptoacetate), dibutyl tin bis-isooctylthioglycolate, di-(n-octyl) tin maleate polymer, dibutyl tin mercaptopropionate, and the like. These and other such tin stabilizers are known thermal stabilizers for polyvinyl chloride. The amount of the tin stabilizer used can be varied. Normally the amount will range from about 1 to about 4 phr—i.e., about 1 to about 4 parts by weight per 100 parts by weight of (a) and (b).

Among the suitable materials for use as impact modifiers the other essential ingredient of the blends of this invention, are styrene-methyl methacrylate grafted on butadiene (MBS), acrylonitrile-styrene grafted on butadiene (ABS), styrene-acrylonitrile grafted on EPDM, styrene-methyl methacrylate-acrylonitrile grafted on butadiene (MABS), chlorinated polyethylene, methyl methacrylate or methyl methacrylate-styrene grafted on a polyacrylate such as polybutylacrylate, vinyl chloride grafted on ethylene-ethyl acrylate copolymer, vinyl chloride grafted on butyl rubber, vinyl chloride grafted on EPDM, ethylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), oxidized polyethylene, styrene-butadiene-styrene (S-B-S) block copolymers, styrene/butadiene multiblock copolymers, styrene/butadiene radial block copolymers, hydrogenated S-B-S block copolymers, styrene/butadiene rubber, acrylic rubbers, EPDM, ethylene/methyl acrylate copolymers, ethylene/ethyl acrylate copolymers, and the like. These materials are available in a wide range of molecular weights and it is generally desirable that the impact modifier have a melt viscosity close to that of the substrate. Amounts of impact modifiers generally fall within the range of from about 5 to about 20 phr.

The blends of this invention can also include other ingredients, such as processing aids, lubricants, pigments, flame retardants, smoke retardants, antioxidants, and the like, for their conventionally employed purposes.

Processing aids of various types are entirely suitable for use in the blends of this invention. For example, use may be made of such polyvinyl chloride processing aids as those made from copolymers of methyl methacrylate and styrene, terpolymers of methyl methacrylate, lower alkyl acrylate and acrylonitrile, or terpolymers of methyl methacrylate, lower alkyl acrylate and dialkyl itaconate, and the like. The preferred processing aids are methyl methacrylate lower alkyl acrylate copolymers having a small portion (e.g., 3 to 15 percent) of the lower alkyl acrylate comonomer and having an inherent viscosity as measured at a concentration of 0.25 grams per 100 milliliters of chloroform at 25° C. of at least 0.1 and preferably 0.5 or higher. A variety of such processing aids, including the preferred types, are available from various commercial sources. The amount of processing aid will generally range from about 0.5 to about 10 phr.

Typical lubricants which may be used in the blends of this invention include metal soaps, stearic acid, glyceryl monostearate, ethyl diaminostearate, paraffin and low molecular weight waxes, and the like. Conventional pigments used in polyvinyl chloride may likewise be used in the blends of this invention in conventional amounts. Ordinarily the concentration of lubricant and pigment will not exceed about 10 phr.

If desired, small amounts of reinforcing fibers such as carbon filaments, asbestos, titanate whiskers, and glass fiber may be employed. The amount of such materials should not exceed about 10 phr. Ordinarily such reinforcing fiber would be used in lieu of a filler although small proportions of both materials may prove satisfactory.

Flame retarding additives which may be used in the compositions of the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are inorganic compounds which are normally effective in combination with halogenated organic compounds. These are material such as antimony compounds (e.g., antimony trixoide), zinc compounds (e.g., zinc borate), antimony-zinc complex compounds (e.g., Oncor 75RA, a product of NL Industries, Inc.), iron compounds (e.g., ferric oxide), and other metal based inorganic compounds which perform well with antimony oxide (e.g., Ongard 2, a product of NL Industries, Inc.). When using a flame retardant, the amount should be sufficient to yield a blend having a UL 94 rating of V-1 or better using test bars 0.060 inch thick.

Smoke suppressing additives may also be used. Examples include alumina trihydrate, cuprous cyanide, and combinations of nickel carbonate and zinc oxide. Organic phosphites and phenolic compounds exemplify suitable antioxidants.

The compositions of the invention may be prepared by blending the components in a mixer (e.g., a Henschel mixer) and compounding the mixture on an extruder (e.g. a Buss Ko-Kneader, a Farrel Continuous Mixer or a Werner-Pfleiderer compounding extruder). Thereafter, the extrudate is chopped into pellets and molded on an injection molding machine.

The present invention is further illustrated in the following examples, which are not to be construed as limiting.

EXAMPLE I

Five different blends of this invention were prepared using a commercial grade of PVC and five different styrene-maleic anhydride copolymers obtained from ARCO/Polymers, Inc. The copolymers were as follows:

| | |
|---|---|
| DKB-134 | Unmodified; 17% maleic anhydride |
| DKB-290 | Unmodified; 25% maleic anhydride |
| DKB-332 | Unmodified; 14% maleic anhydride |
| DKB-350 | Rubber-modified; 75.7% styrene, 12.3% maleic anhydride, 12% rubber (i.e., 86% styrene-14% maleic anhydride copolymer containing 13.6 phr rubber) |
| DKB-218 | Rubber-modified; 74.7% styrene, 15.3% maleic anhydride, 10% rubber (i.e., 83% styrene-17% maleic anhydride copolymer containing 11.1 phr rubber) |

The PVC and the respective copolymers were mechanically blended in equal proportions by weight employing a formulation used in making proprietary tin-stabilized PVC compositions. The proportions of the materials used in these five respective blends were as follows:

| Parts by Weight | Components |
|---|---|
| 50 | Polyvinyl Chloride |
| 50 | Styrene-Maleic Anhydride Copolymer |
| 2 | Tin Stabilizer |
| 4.5 | Lubricants |
| 12 | Impact Modifier (MBS-type) |
| 2 | Processing Aid |
| 3 | CaCO$_3$ Reinforcing Filler |

A control blend (100 parts by weight of the same PVC and no styrene maleic anhydride copolymer) having the same amounts of the same other ingredients was also made. The dynamic thermal stability (DTS) of these blends was as follows:

| | | Styrene-Maleic Anhydride Copolymer Used | | | | | |
|---|---|---|---|---|---|---|---|
| | None (Control) | DKB-134 | DKB-134 | DKB-290 | DKB-332 | DKB-350 | DKB-218 |
| DTS (minutes) | 17.5 | 14 | 16 | 12.5 | 14 | 12.5 | 11 |
| Equilibrium Torque (m-g) | 790 | 900 | 890 | 970 | 1100 | 1150 | 1090 |
| Banbury drop temperature °F. | 320 | 340 | 320 | 320 | 320 | 320 | 320 |

The above blends were injection molded on a New Britain injection molding machine at the following conditions:
Zone 1: 310° F.
Zone 2: 320° F.
Zone 3: 330° F.
Nozzle: 70%
Injection Speed: 5 turns off maximum
Shot Size: 1.25–1.3
Hold Time: 5 seconds
Cooling Time: 35 seconds
Mold Temperature, °F.: 100/100
Injection Pressure: Maximum
Hold pressure: 1300 psi
Back Pressure: 400 psi

| | | Styrene-Maleic Anhydride Copolymer Used | | | | | |
|---|---|---|---|---|---|---|---|
| | None (Control) | DKB-134 | DKB-134 | DKB-290 | DKB-332 | DKB-350 | DKB-218 |
| Amps | 6.6 | 6.8 | 7.2 | 7.2 | 7.0 | 7.1 | 7.2 |
| Screw Recovery Time | 14 | 10 | 10 | 10 | 10 | 9 | 9 |
| Spiral Flow, inches | 17.75 | 18.25 | 19 | 18.25 | 16.75 | 13.5 | 13.5 |

The physical properties of these blends are shown in Table I.

TABLE I

| Physical Properties of Blends | | | | | | | |
|---|---|---|---|---|---|---|---|
| | None (Control) | DKB-134 | DKB-134 | DKB-290 | DKB-332 | DKB-350 | DKB-218 |
| Specific Gravity | 1.315 | 1.198 | 1.205 | 1.223 | 1.260 | 1.186 | 1.120 |
| Tensile-Yield, psi | 5720 | 6750 | 6820 | 6440 | 6360 | 4650 | 5200 |
| Tensile Elast. Mod., 10$^3$ psi | 353 | 419 | 399 | 400 | 421 | 295 | 331 |
| Elongation, % | 10 | 10 | 7.5 | 8.7 | 6.7 | 6.9 | 8.8 |
| Flexural Strength, psi | 10,300 | 11,400 | 12,000 | 10,600 | 11,400 | 8,300 | 9,150 |
| Flex. Elast. Mod., | 337 | 381 | 384 | 384 | 380 | 299 | 277 |

TABLE I-continued

| | Physical Properties of Blends | | | | | | |
|---|---|---|---|---|---|---|---|
| | None (Control) | DKB-134 | DKB-134 | DKB-290 | DKB-332 | DKB-350 | DKB-218 |
| $10^3$ psi | | | | | | | |
| Izod Impact, ft-lbs/in. | | | | | | | |
| ⅛ inch bar | 7.70 | 0.60 | 0.60 | 0.50 | 0.60 | 1.00 | 0.80 |
| ⅜ inch bar | 15.80 | 0.70 | 0.60 | 0.50 | 0.50 | 1.20 | 1.10 |
| Heat Deflection Temperature, °C. | | | | | | | |
| at 264 psi | 65 | 74 | 73 | 75 | 72 | 72 | 72 |
| at 66 psi | 72 | 95 | 93 | 99 | 89 | 77 | 91 |
| Annealed HDT 90° C., | | | | | | | |
| at 264 psi | — | — | 107 | 90 | 83 | 78 | 79 |
| at 66 psi | — | — | 117 | 116 | 104 | 102 | 109 |
| Rockwell Hardness, R Scale | 99 | 109 | 109 | 109 | 109 | 97 | 102 |

EXAMPLE II

Another blend of this invention was made using "Dylark" DKB-290, a product of ARCO/Polymers, Inc., an unmodified styrene-maleic anhydride copolymer containing 18 percent by weight of maleic anhydride. The same formulation of ingredients as in Example I was used. A control sample was also made. The properties of the blend are given in Table II.

TABLE II

| Physical Properties of Blend | | |
|---|---|---|
| | Control | "Dylark" DKB-290 |
| Specific Gravity | 1.324 | 1.208 |
| Tensile-Yield, psi | 5730 | 6440 |
| Tensile Elastic Mod., $10^3$ psi | 333 | 365 |
| Elongation, % | 12.7 | 11.5 |
| Flexural Strength, psi | 10,100 | 11,400 |
| Flexural Elastic Mod., $10^3$ psi | 322 | 378 |
| Izod Impact, ft-lb/in., | | |
| ⅛ inch bar | 9.2 | 0.5 |
| ⅜ inch bar | 16.1 | 0.5 |
| Heat Deflection Temperature, °C. | | |
| at 264 psi | 65 | 73 |
| at 66 psi | 72 | 92 |
| Heat Deflection Temperature, (annealed at 90° C.) | | |
| at 264 psi | 72 | 100 |
| at 66 psi | 76 | 112 |
| Rockwell Hardness, R Scale | 99 | 109 |
| Vicat Softening Point, °C. | — | 115 |
| Brabender Equilibrium Torque (m-g) | 780 | 890 |
| Brabender DTS, minutes | 18 | 18 |
| Spiral Flow, inches | 18.5 | 19.75 |
| Screw Recovery Time, seconds | 11 | 9 |

The most preferred compositions of this invention have the following properties:

An Izod impact strength (ASTM D 256, Method A) of at least 1.0 foot pound per inch, A heat deflection temperature (ASTM D 648) at 66 psi of at least 85° C., and A dynamic thermal stability of at least 10 minutes.

This invention is susceptible to variation within the spirit and scope of the invention herein disclosed and claimed.

We claim:

1. A thermoplastic molding composition which comprises in intimate admixture:
   (a) a vinyl chloride polymer having a relative viscosity as measured at a concentration of 1 gram per 100 grams of cyclohexanone at 25° C. falling within the range of about 1.50 to about 1.85;
   (b) a copolymer of a vinyl aromatic compound and an α,β-unsaturated cyclic anhydride in which the relative proportions of said compound and said anhydride fall within the range of about 91 to about 70 weight percent of said compound and about 9 to about 30 weight percent of said anhydride; and
   (c) a tin-containing stabilizer and an impact modifier of styrene-methyl methacrylate grafted on polybutadiene;
   with the proviso that said admixture contains 60 to 40 weight percent of (a) and 40 to 60 weight percent of (b), with the remainder being component (C), and the further proviso that the blend has the following properties:
   (d) an Izod impact strength (ASTM D 256, Method A) of at least 0.5 foot pound per inch;
   (e) a heat deflection temperature (ASTM D 648) at 66 psi of at least 75° C.; and
   (f) a dynamic thermal stability of at least 10 minutes.

2. A composition of claim 1 wherein (b) is a copolymer of a styrene and maleic anhydride.

3. A composition of claim 1 wherein (b) is a copolymer of styrene and maleic anhydride in which the relative proportions fall within the range of about 86 to 80 weight percent of styrene and about 14 to about 20 weight percent of maleic anhydride.

4. A composition of claim 1 wherein said admixture contains about 50 weight percent of (a) and about 50 weight percent of (b).

5. A composition of claim 1 wherein (a) is polyvinyl chloride.

6. A composition of claim 1 wherein (a) is polyvinyl chloride having a relative viscosity as measured at a concentration of 1 gram per 100 grams of cyclohexanone at 25° C. falling within the range of about 1.50 to about 1.65.

7. A composition of claim 1 wherein (a) is polyvinyl chloride and (b) is a copolymer of a styrene and maleic anhydride.

8. A composition of claim 1 wherein (a) is polyvinyl chloride having a relative viscosity as measured at a concentration of 1 gram per 100 grams of cyclohexanone at 25° C. falling within the range of about 1.50 to about 1.65, and (b) is a copolymer of styrene and maleic anhydride in which the relative proportions fall within the range of about 86 to about 80 weight percent of styrene and about 14 to about 20 weight percent of maleic anhydride.

* * * * *